S. G. SOLEY.
TRACTION WHEEL LUG.
APPLICATION FILED NOV. 25, 1921.
1,437,118.
Patented Nov. 28, 1922.
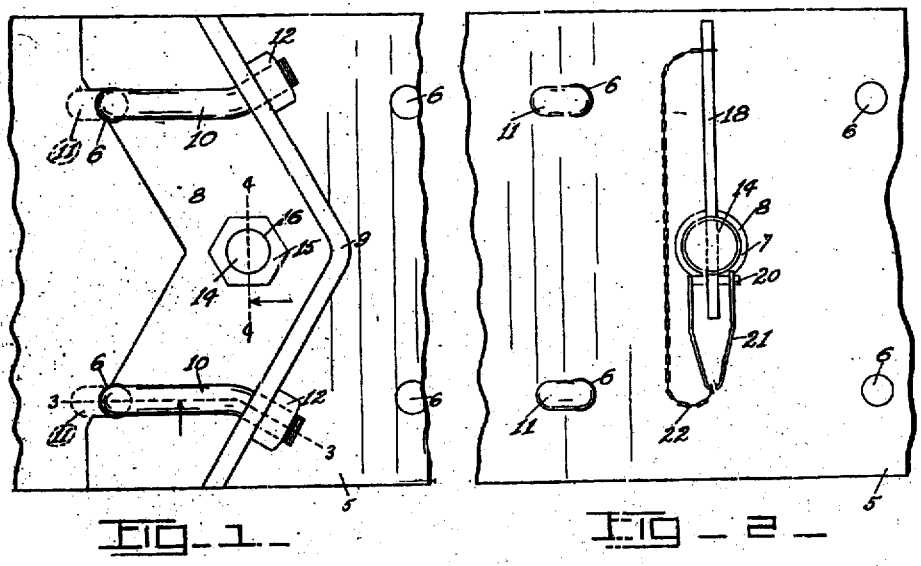
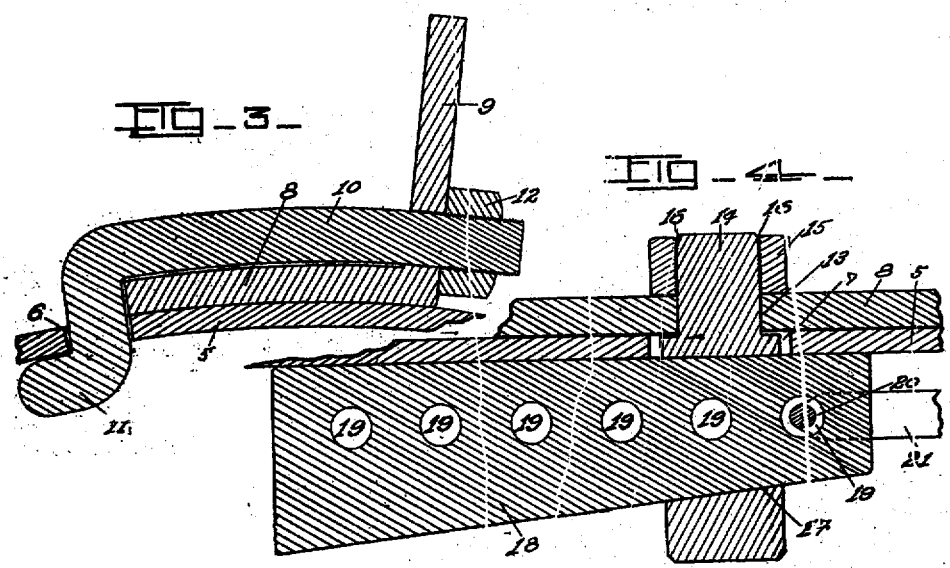
Inventor
STANLEY G. SOLEY
By A. E. Carlsen
Attorney

UNITED STATES PATENT OFFICE.

1,437,118

Patented Nov. 28, 1922.

STANLEY G. SOLEY, OF MINNEAPOLIS, MINNESOTA.

TRACTION-WHEEL LUG.

Application filed November 26, 1921. Serial No. 518,061.

*To all whom it may concern:*

Be it known that I, STANLEY G. SOLEY, a citizen of the United States, residing at Minneapolis, in the county of Hennepin and State of Minnesota, have invented certain new and useful Improvements in Traction-Wheel Lugs, of which the following is a specification.

This invention relates to mud lugs for tractors and other heavy vehicles, and the main object is to provide a quickly detachable, simple, efficient and practical construction of lug for said purpose. Further objects will be disclosed in the course of the following specification and are illustrated in the accompanying drawing, in which:

Fig. 1 is a face view of a fractional part of a tractor wheel rim showing my improved lug as secured thereto.
Fig. 2 is a bottom view of the construction shown in Fig. 1.

Fig. 3 is an enlarged detail section on the line 3—3 in Fig. 1.

Fig. 4 is an enlarged detail section on the line 4—4 in Fig. 1.

Referring to the drawing by reference characters 5 designates the rim of a tractor wheel, the same having holes 6 along its sides and a row of centrally located holes 7.
Each lug consists primarily of an angular base portion 8 having an integrally formed upstanding flange 9. A pair of bolts 10 having hooks 11 (adapted to engage the holes 6) at one end are secured at their opposite ends in the flange 9 by nuts 12.

Near the pointed end of the lug and in the base portion 8 thereof is mounted as at 13 a retaining bolt 14. The upper end of this bolt is slightly smaller than the main body portion, said smaller end being rotatable in the lug and retained therein by a nut 15. Said nut 15 is jammed as at 16 or is spot welded before screwed tight onto the bolt so that the latter is free to rotate.
The lower end of the bolt 14 extends through the holes 7 in the wheel rim and is provided with a slot 17 in which is engageable a wedge member 18. The wedge 18 is provided with a series of holes 19 in one of which engages a pin 20 to prevent the wedge from slipping out. The pin 20 is secured to a spring 21 the latter being secured by a cord or chain 22 to the wedge to prevent the pin from becoming lost.
When securing the lug to the wheel rim it is first necessary to insert the hooks 11 in the holes 6. The bolt 14 then drops down in the hole 7. The wedge 18 is then inserted, and if necessary, is slightly driven into the slot 17, the retaining pin 20 thereafter being secured in the hole 19 to prevent dislodgment of the wedge.

As above stated the bolt 14 is rotatable the object being to enable the wedge 18 to be driven into the bolt from any suitable direction which may occasionally be necessary in order to avoid spokes or other interfering objects.

It is understood that suitable modifications may be made in the design and structure of this device provided, however, that such modifications come within the spirit and scope of the appended claims. Having now therefore fully shown and described my invention, what I claim to be new and desire to protect by Letters Patent is:

1. A mud lug for traction wheels consisting of a base portion and an upstanding flange integral therewith, a pair of bolts resting on said base portion, said bolts being secured at corresponding ends in said lug flange and having hooks at their other ends adapted to engage the wheel rim and secure thereto the ends of the lug, and means for securing the middle portion of the lug to said rim.

2. A mud lug for traction wheels consisting of a base portion and an upstanding flange integral therewith, means for detachably securing the ends of the lug to the rim of the wheel, a bolt rotatably secured at the center of the lug and extending down through a hole in the rim, and a wedge adapted to be driven into a slot in said bolt, under the rim.

3. A mud lug for traction wheels consisting of a base portion and an upstanding flange integral therewith, bolts secured to the lug and having hooks at their forward ends adapted to engage in holes in the rim of the wheel, means at the center of the lug for detachably securing it to the rim, consisting of a bolt secured in the base portion of the lug and extending down through a hole in the rim, and means for securing said bolt in a rigid position in said rim hole.

In testimony whereof I affix my signature.

STANLEY G. SOLEY.